United States Patent [19]
Hayes

[11] Patent Number: 5,715,044
[45] Date of Patent: Feb. 3, 1998

[54] LASER RADAR

[75] Inventor: Cecil L. Hayes, Placentia, Calif.

[73] Assignee: Boeing North American, Inc., Seal Beach, Calif.

[21] Appl. No.: 312,523

[22] Filed: Feb. 22, 1989

Related U.S. Application Data

[63] Continuation-in-part of Ser. No. 85,499, Aug. 14, 1987, Pat. No. 5,323,223.

[51] Int. Cl.⁶ .................................................. G01C 03/08
[52] U.S. Cl. ...................................... 356/5.09; 356/5.11
[58] Field of Search ..................... 356/5, 5.09, 5.11; 342/129

[56] References Cited

U.S. PATENT DOCUMENTS

| | | | |
|---|---|---|---|
| 3,082,418 | 3/1963 | Milosevic | 342/129 |
| 3,437,820 | 4/1969 | Thompson, Jr. et al. | 356/5 |
| 3,522,992 | 8/1970 | Jaffe | 356/5 |
| 3,542,472 | 11/1970 | Smith-Vaniz | 356/5 |
| 3,625,619 | 12/1971 | Scholdstrom | 356/5 |
| 3,750,172 | 7/1973 | Tresselt | 342/129 |
| 3,778,159 | 12/1973 | Hines et al. | 356/5 |
| 4,005,936 | 2/1977 | Redman et al. | 356/5 |
| 4,163,954 | 8/1979 | Hayes | 356/5 |
| 4,190,361 | 2/1980 | Dubrunfaut | 356/5 |
| 4,537,502 | 8/1985 | Miller et al. | 356/5 |

Primary Examiner—Mark Hellner
Attorney, Agent, or Firm—Tom Streeter; Charles T. Silberberg

[57] ABSTRACT

The inventive laser radar uses a multiple frequency processing technique for the purpose of extracting relative range information from a received signal by transmitting and receiving two frequencies that are derived from a reference signal source modulated by two modulators that are driven by a different frequency, the reference frequency source also serving as a local oscillator.

13 Claims, 10 Drawing Sheets

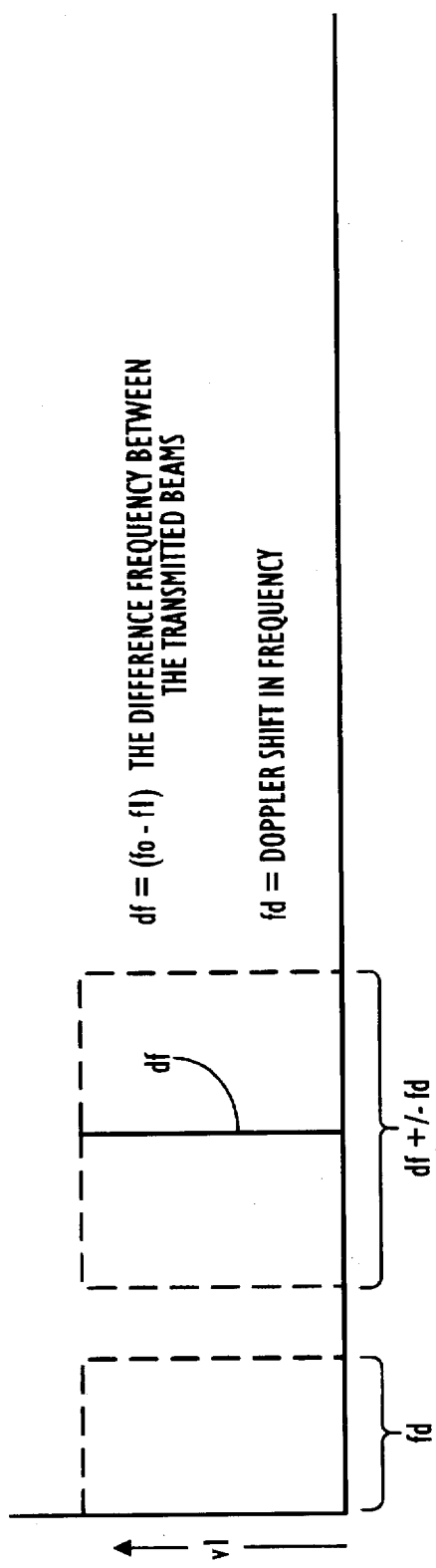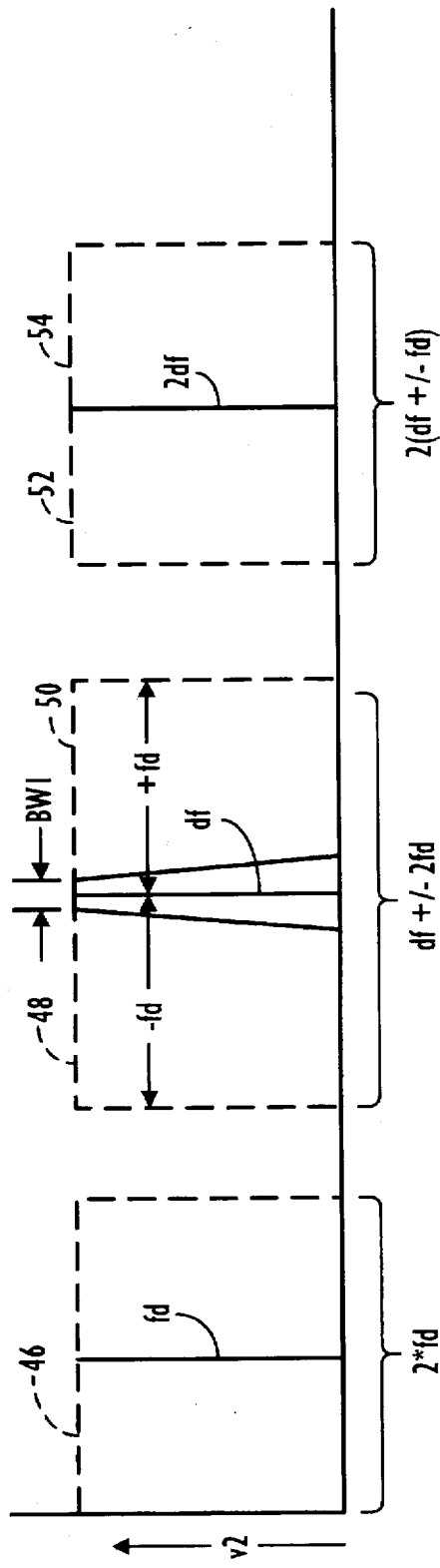

1

LASER RADAR

This is a continuation-in-part of application Ser. No. 07/085,499, filed on Aug. 14, 1987, now U.S. Pat. No. 5,323,223.

BACKGROUND OF THE INVENTION

1. Field of the Invention

This invention relates to the field of Radar and more particularly to the field of radar transmitters and receivers.

2. Description of Prior Art

Laser radar having two laser sources for use in radar applications are Known. These laser sources are frequency-locked at different frequencies by a frequency modulation servo. The complexity of a two laser source was reduced to a single laser source as disclosed in copending U.S. patent application Ser. No. 07/085,499 filed Aug. 14, 1987, now U.S. Pat. No. 5,323,223 for a RADAR LASER TRANSMITTER, having the same inventor and assignee. The single laser system was able to measure relative range to targets only if relative motion existed between the target and the transmitter.

Subject matter related to processing multiple frequency signals appears in a text titled *Introduction to Radar Systems* by author M. I. Skolnik; published by MCGRAW HILL, 1962.

SUMMARY OF THE INVENTION

This invention characterizes an improved radar transmitter for use in imaging a target scene while moving to or from the scene and is capable of measuring relative range and absolute range to targets where there is no relative motion present between the target and the transmitter.

The present laser invention LASER RADAR eliminates the need for the second laser source and the frequency locking-servo.

The invention laser radar uses a multiple frequency processing technique for the purpose of extracting relative range information from the received signal. Two frequencies are transmitted and received. A reference signal source is modulated by two modulators. Each modulator is driven at a different frequency. The reference source is used as a local oscillator for the received signals.

It is a major objective of this invention to provide a laser source of illumination to a scanner, the laser source having first and second frequency components derived by the use of dual modulators such as acousto-optic modulators.

It is a further objective of this invention to receive reflected light from the target scene, to couple the received light onto a detector for the purpose of producing an electrical signal containing frequency difference information; the frequency difference information providing range, position and speed information, It is a further objective of this invention to eliminate unwanted doppler shift related signals by using a difference detection after the first stage of detection. The second function shifts undesired doppler signals to a higher frequency. Shifting the spectral location of these signals makes it possible to conveniently remove them by use of a conventional passive band-pass filter.

BRIEF DESCRIPTION OF THE DRAWINGS

FIG. 7 is a graph Illustrating the spectral content of the RANGE CARRIER v1 signal from DET 1 of FIG. 4.

FIG. 8 is a graph illustrating the spectral content of the DIFFERENCE RANGE CARRIER signal v2 present at the output of the DIFFERENCE DETECTOR 110 of FIG. 4.

PREFERRED EMBODIMENT

INTRODUCTION

Figure 1:
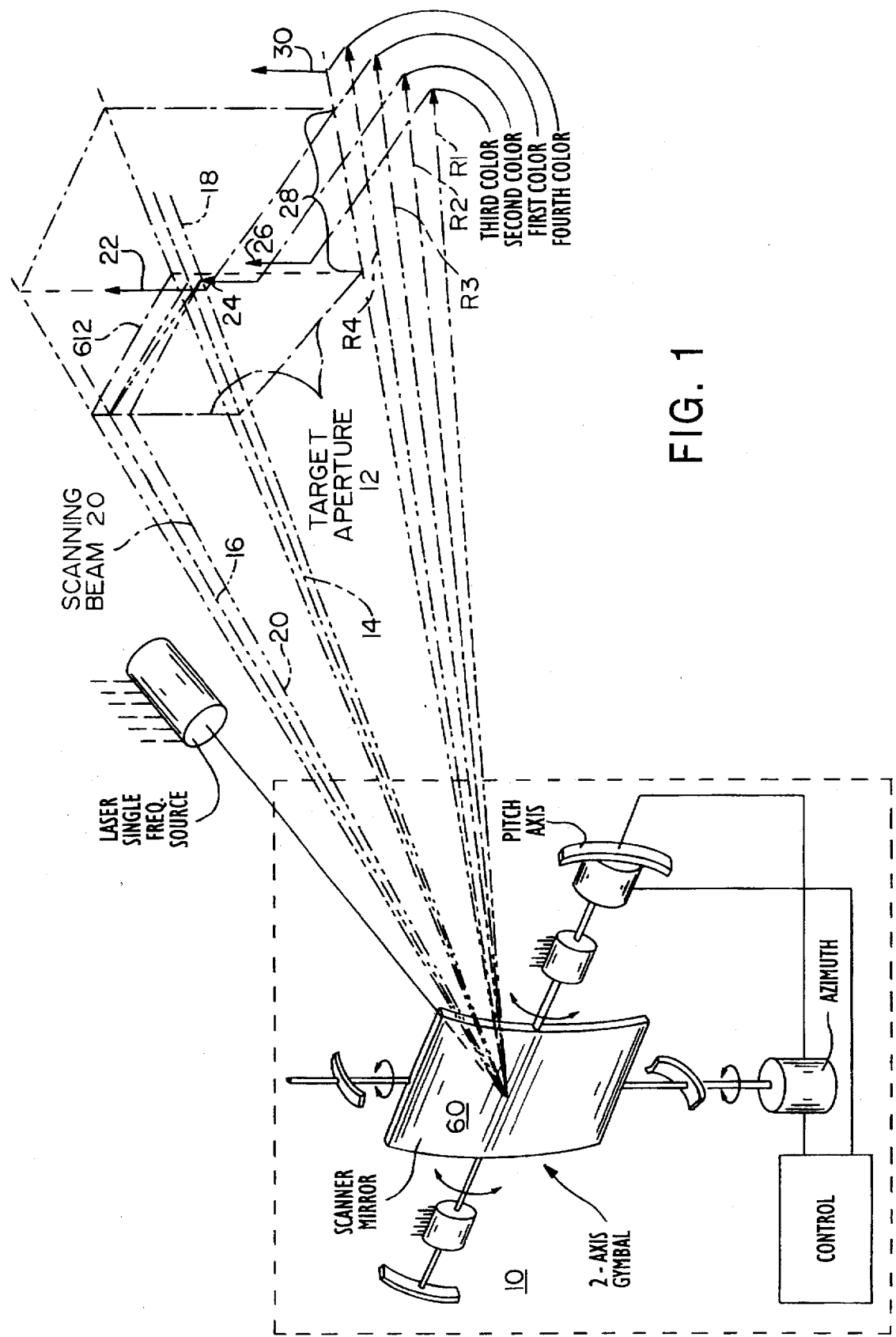
FIG. 1 is a perspective view of the target scene of FIGS. 2a–2c showing the invention laser radar scanning the target aperture pixel locations of FIG. 3.

FIG. 1 schematically depicts a laser radar within phantom block 10 scanning a target aperture defined by phantom block 12. A laser beam represented by rays 14, 16, 18 and 20 moves sequentially through the positions shown to illuminate the target scene captured by the target aperture 12. Targets 22, 24, and 26 are depicted within the scene at different relative ranges within the range cell distance 8 and target 7 is shown to be beyond the range cell. The laser radar beam 14, 16, 18 is typically a two frequency beam and is typically a low power continuous coherent laser source of light.

Figure 2A:
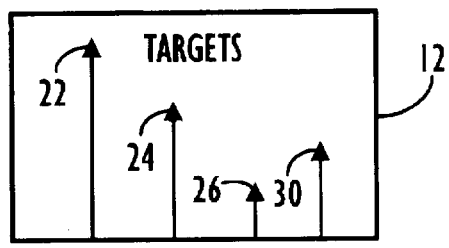
FIGS. 2a–2c are respective FRONT, TOP and SIDE views of the target scene of FIG. 1.
Figure 2C:
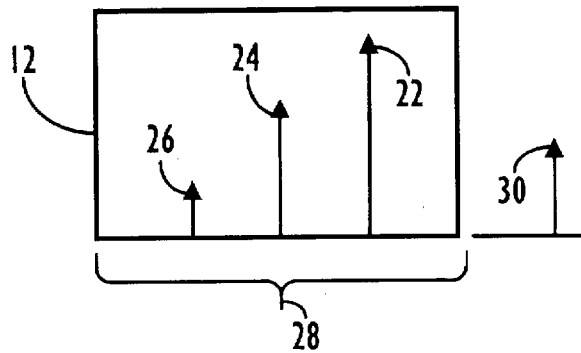
Figure 2B:
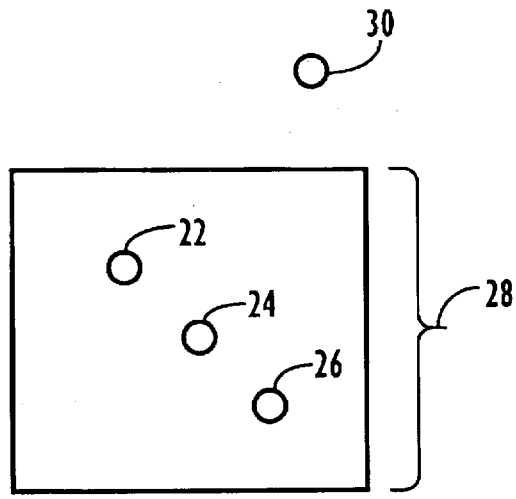

FIGS. 2a, 2b and 2c show the relative location of the targets 22, 24, and 26 within the relative range cell distance 28. Target 30 is slightly beyond the range cell of the laser radar 10. The laser radar is designed to scan the target aperture 12 and to graphically display the likeness of the targets within the target aperture 12 as to their intensity and their relative distance into the range cell by displaying the scene as a rectangular array of pixels on a video monitor.

The laser radar distinguishes the relative distance of each target appearing in the scene by coloring each target pixel within a target scene in accordance with the respective relative range of a target within the pixel. Target 22 is colored with a first color, target 24 is colored with a second color, target 26 is colored with a third color and target 30 is colored with a fourth color. To form a picture, the laser radar determines the intensity of the signal return for each pixel within the target scene, the relative range of the target return signal surface within the particular target pixel with respect to its distance into the range cell and the absolute range of the reflective surface within each target pixel. The intensity value, the relative range value and the absolute range value for each pixel is stored in digital memory locations reserved for each respective pixel comprising the image scene.

Figure 3A:
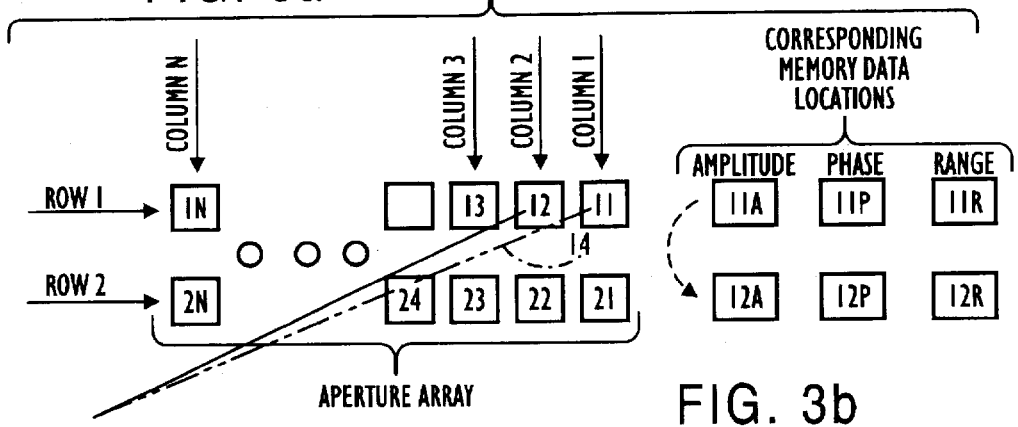
FIGS. 3a–3e are a sequence of figures schematically depicting the movement of the light beam of a laser radar as the beam scans a target aperture array of pixel (i.e., picture element) locations and corresponding data locations within a memory subsystem for receiving signal amplitude, signal phase values, and absolute range information for the signal returns associated for each respective pixel.
Figure 3B:
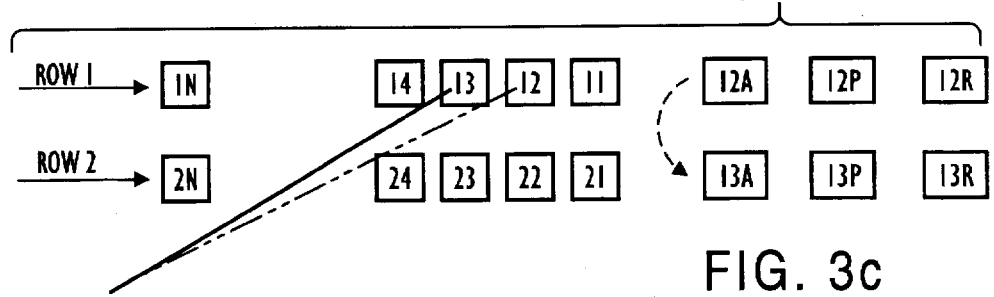
Figure 3C:
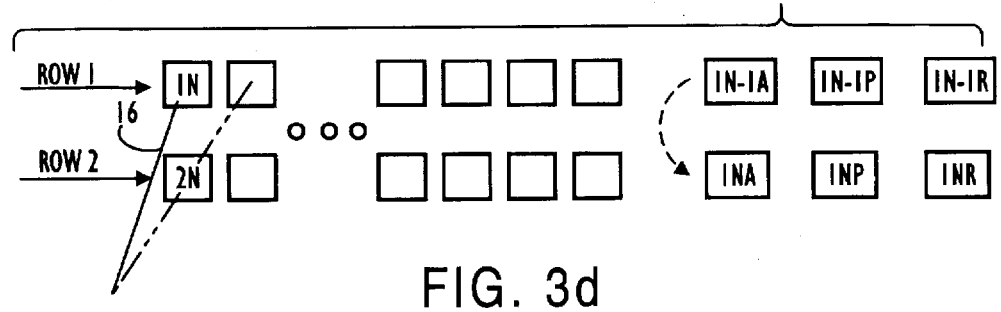
Figure 3D:
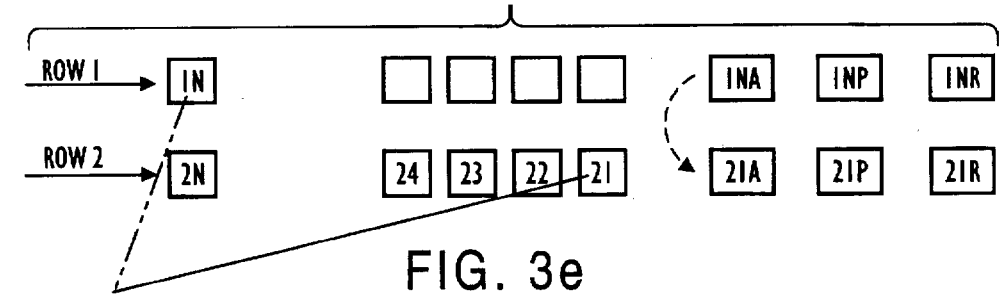

FIGS. 3a through 3e characterize movement of the transmitted beam across the target aperture. The beam moves across the top row from left to right from a first to a second, from a second to a third, and finally to an Nth pixel (picture element) location. The first line or row of pixel locations are designated as row 1. FIG. 3d shows the beam being retraced from row 1 to row 2 in the aperture array of pixels. A beam is shown moving from the 1N location to the 21 pixel location. The second row is then scanned in turn from right to left.

Blocks 11A, 11P and 11R at the right of FIG. 3a represent memory storage locations for the 11 pixel location in which the laser radar will store intensity data, range phase data and absolute range data for that pixel. The laser radar determines the value to be placed in each of these three data locations from the reflected signal information received back as the beam is directed through pixel 11.

The transmitted beam shown in FIG. 1 and FIGS. 3a-3g is a continuous source of light. The light moves from the transmitter within phantom block 10 through the target aperture, and is reflected by respective targets within each aperture pixel as the beam is moved from one pixel within the target scene to the next pixel. FIG. 3a shows the beam passing through aperture pixel 12 after having moved from pixel 11. The first digit in the pixel number relates to the pixel array row and the second to the pixel array column. Intensity, relative range or phase data and absolute range date for pixel 11 is stored in memory locations 11A, 11P and 11C as the beam is moved to pixel location 12.

Figure 3E:
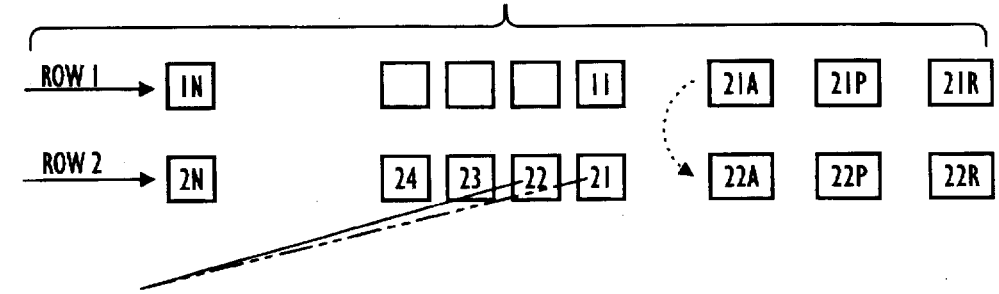

FIG. 3b shows a beam moving from pixel 12 to pixel 13. Data for pixel location 12 is stored in respective memory locations 12A, 12B and 12C. FIG. 3c shows a beam moving to the last pixel in the first row of pixels. FIG. 3d shows the beam advancing from pixel 1N to 21 as data is stored in memory locations 1NA, 1NP and 1NR at the conclusion of scanning the first row. FIG. 3e is an extension of the previous figures showing the second row of pixels being scanned as the data is stored for each pixel on the respective memory locations.

DUAL LASER SYSTEM RELATIVE RANGE DETECTION

Figure 4:
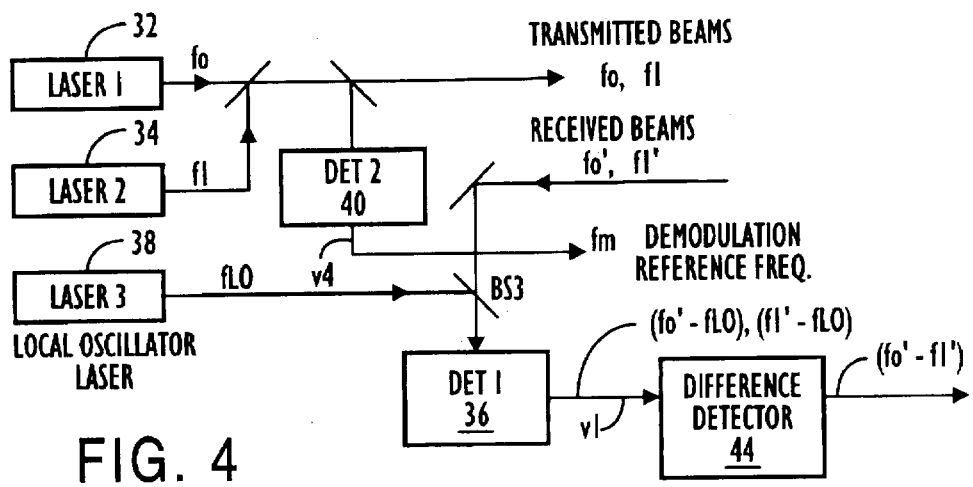
FIG. 4 is a block diagram of a two laser radar having a laser local oscillator. The lasers are presumed to be locked in frequency to different respective frequencies.

FIG. 4 is a block diagram of a basic two laser transmitter and receiver. Laser 1, 32 transmits light at frequency fo and laser 2, 34 transmits light at frequency f1. The signals travel to the target as continuous beams, both beams passing through the same target pixel. Both beams return as reflected signals fo' and f1'. The returning signals are at light frequency. The frequency difference between beams fo and f1 is fixed by an electronic control (not shown) and is called the offset frequency df. Mixing a sample of the two transmitted signals provides a reference difference signal referred to as the DEMODULATION REFERENCE SIGNAL fm having a frequency (fo–f1). Diode detectors, such as DET 1, 36 provide the mixing function and the reference difference signal v1. The diode detector will not respond to signals at laser light frequency which is typically in the range of $1*10^{14}$ Hertz.

The range cell distance 28 of a system is established by recalling first that light has an approximate velocity of:

$$C=3*10^{+8} \text{ m/s},$$

Relative range of targets within range cell distance 28 as shown in FIGS. 1 and 2a–2c is determined by the system of FIG. 4 by measuring the phase difference between a beat signal detected by mixing the signal components f1', fo' present on the received beams from a target pixel to obtain the frequency difference signal (f1'–fo').

The DEMODULATION REFERENCE SIGNAL represented by the beat signal fm is the frequency difference between TRANSMITTED BEAMS fo and f1.

The period for one cycle or $2\pi$ radians of the RELATIVE RANGE SIGNAL at frequency fm is:

$$T=1/fm$$

The system of FIG. 4 measures the phase difference between the difference signal received from a target aperture pixel (f1'–fo') and the DEMODULATION REFERENCE SIGNAL fm.

As the time required for light to travel from the SINGLE FREQUENCY LIGHT SOURCE to the target and return to the receiver begins to exceed the time required by the system for completion of one cycle of the DEMODULATION REFERENCE SIGNAL, the system loses the ability to establish the absolute range of the target. Alternate embodiments of the system periodically shift the frequency of fm to bring the time required for signal transit and return to be equal or less than the time required for one period of the DEMODULATION REFERENCE FREQUENCY v4 at frequency fm.

The maximum range, or range cell distance 28, through which light can move to a target and return without exceeding the period of the DEMODULATION REFERENCE FREQUENCY v4 is referred to as the ambiguity range R of the system and is given by the equation:

$$R=C/(2*fm)$$

where C is the speed of light and fm ts the DEMODULATION REFERENCE FREQUENCY. For example, if $fm=20*10^{+6}$ Hz, R=7.5 meters and if $fm=100\times10^{+3}$ Hz, R=1500 meters.

FIG. 4 shows transmitted beams leaving the laser radar as a single ray with frequencies fo and f1. Reflected energy is returned from the target as a single ray at frequencies fo', f1'. These frequencies may be equal to fo and f1, or they may differ as a result of doppler shift due to the rate of change of distance between the transmitter and the receiver.

FIG. 4 shows the laser transmitting source has a local oscillator having a frequency fLO. LASER 3, 38 is the local oscillator laser.

The received signals fo', fl' and the sample fLO of the local oscillator are superimposed on detector DET 1, 36. DET 1, 36 and DET 2, 40 cannot electrically respond to frequencies fLO, fo' and fl' because these signal frequencies are light frequencies in the range of $10^{+14}$ Hz. DET 1 and DET 2 do respond electrically to difference frequencies such as (fo'-fLO) and (fl'-fLO).

Figure 5:
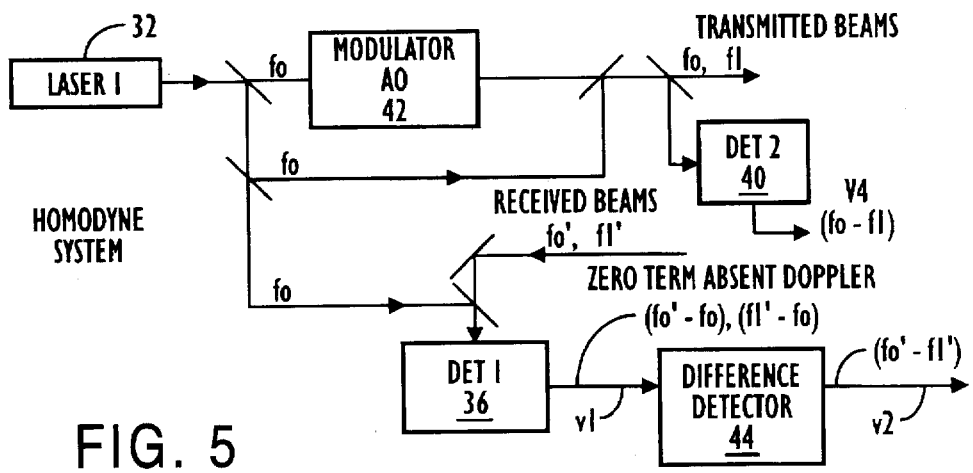
FIG. 5 is a block diagram of a single laser radar with one modulator capable of determining relative range with relative velocity present between the target and the laser radar.
Figure 9:
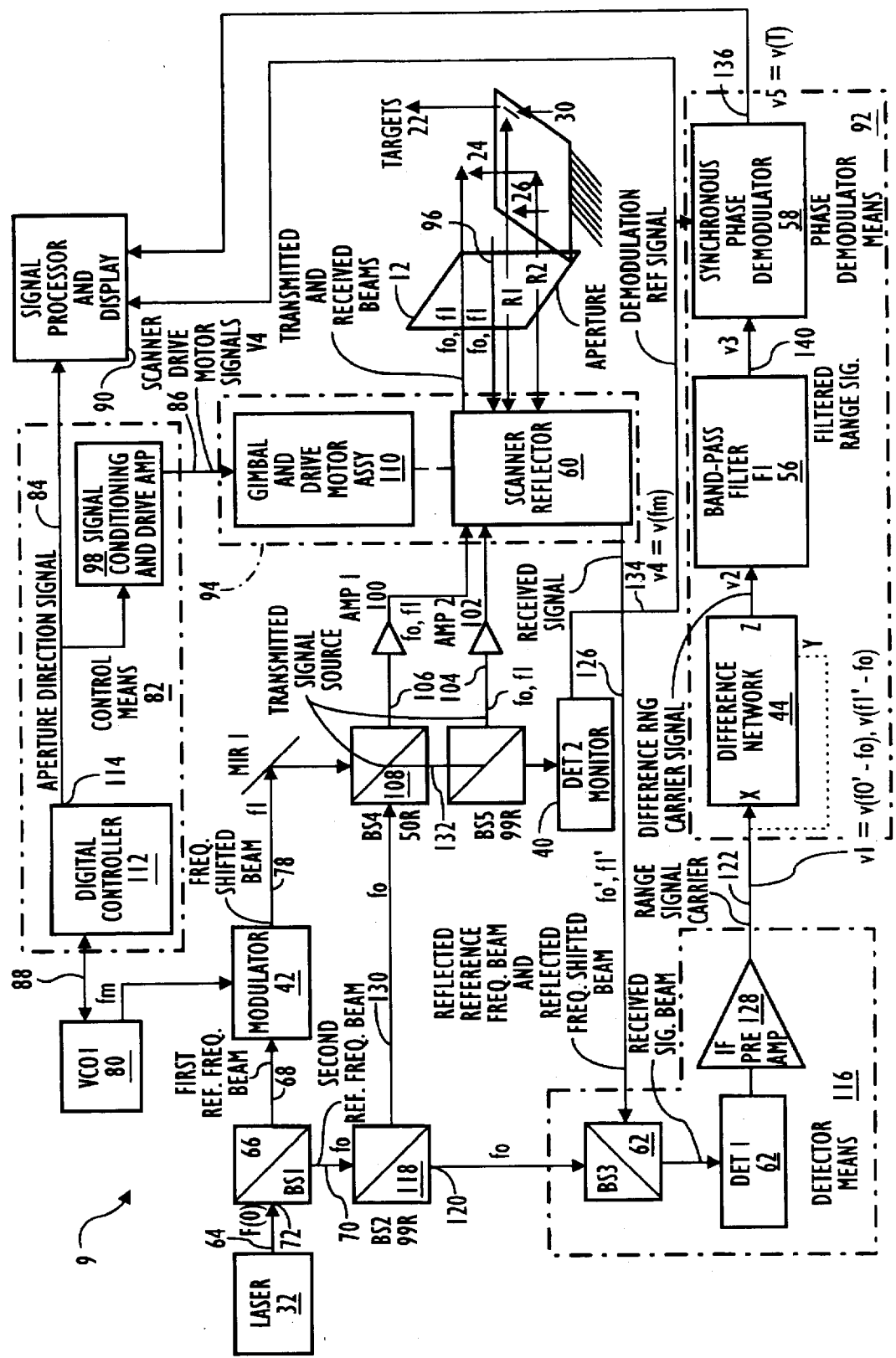
FIG. 9 is a block diagram showing the arrangement of components in a single modulator embodiment of the invention laser radar of FIG. 5 for measuring relative range information between targets with relative velocity present between the laser radar and the target.

The system of FIG. 5, which is shown in greater detail in FIG. 9, eliminates one laser and the local oscillator. A modulator AO 42 is driven by a fixed frequency oscillator at the desired difference frequency. The modulator upshifts the frequency of the signal fo to fl. Signals fo and fl are then combined for transmission.

The received signals for the system of FIG. 5 are fo' and fl'. A sample of the transmitted signals are combined at DET 2, 40 to form a demodulation reference signal fm=(fo-fl). DET 2, 40, is a detector similar or identical to DET 1. Received signals fo' and fl' are combined with a sample of the laser 1 light signal at frequency fo for detection at DET 1, 36.

The signals fo' and fl' of FIG. 5 are subject to a doppler shift in frequency when the laser radar is moving to or away from the target reflecting information through an aperture pixel. At transmitter frequencies of $10^{+14}$, the sensitivity to change in frequency is high for small changes in the relative velocity between the receiver and the target.

With no doppler shift present, fo has a frequency identical to fo' and the signal fl has a frequency identical to fl'. With no relative motion between the laser radar transmitter and the target, there is no doppler shift. The DET 1, 36 signal for the term (fo-fo') of FIG. 5 therefore represents a difference of identical frequencies. A detector or mixer will not produce a beat frequency for two terms having the same frequency. In the absence of doppler shift, the term (fo-fo') produces a zero beat or dc result. The term (fl'-fo) is detectable and can be amplified but does not contain the required beat information present in (fo'-fl') which is necessary for phase comparison with (fo-fl) from DET 2 for relative range measurement.

Figure 6:
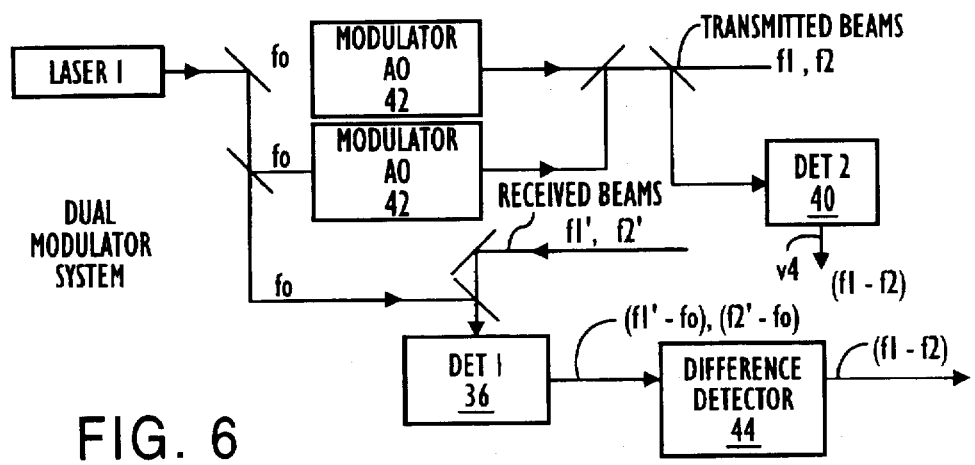
FIG. 6 is a block diagram of a one laser, two modulator system with two modulators capable of determining relative range without relative velocity present between the target and the laser radar.

FIGS. 4, 5 and 6 each show the use of a DIFFERENCE DETECTOR 44. The DIFFERENCE DETECTOR 44 is typically a digital signal processor for extracting the difference frequency when doppler information is present.

With doppler or relative motion between the laser radar and the target present, change in the frequency of the signal components of v1 with respect to v4 interferes with the systems ability to make relative phase measurements between the two signals necessary to produce range to target signal values.

To illustrate the significance of doppler shift at laser frequencies, consider that a doppler shift of approximately 200 kHz results from a relative velocity difference between the lasers radar and the target of 1 meter/sec. In an alternative application, targets moving at MACH1 with respect to the transmitter can have 60 MHz of doppler shift. Earth orbital velocities increase the doppler frequency shift to approximately 1.5 GHz.

The present invention eliminates the necessity for a second laser source and a local oscillator source. The invention laser radar of FIG. 6 has the advantage of being able to obtain a received signal capable of providing relative range and absolute range information but free of the necessity for complex signal processing made necessary by doppler effects due to relative motion between the invention laser radar and the target. In typical military applications, the transmitter or the targets of interest or both can be moving and if motion is present, doppler shift in the return signals will unreasonably complicate the process of extracting range information from return signals.

The invention of FIG. 6 uses a DIFFERENCE DETECTOR 44 in cooperation with narrow band filtering to extract relative range information that its present in received signals having significant doppler frequency shift between the transmitted and received frequencies. DIFFERENCE DETECTOR 44 operates In cooperation with a band pass filter shown in FIG. 9 to produce a difference signal having a spectral component (fo'-fl') that is essentially free of error due to doppler effects.

In practice, laser radar systems have great utility when used to monitor or detect tactical targets where relative motion is unavoidable and even greater utility where relative motion need not be present between the target and the laser radar.

ANALYSIS FOR USE OF DIFFERENCE DETECTOR

The dual modulator system of FIG. 6 evolved as a result of an analysis that proceeds by referring to the dual frequency signals of the system of FIG. 4, i.e. fo and fl. FIG. 4 shows that the received signal v1 from the target out of detector DET 1 has several spectral components which include:

fd=A received signal component having a doppler frequency shift. The doppler shift can vary from zero to an upper limit or maximum doppler shift related to the applications maximum relative velocity.

df=df is the frequency difference between the first transmitted beam at frequency fo and second transmitted beams at frequency fl.

Figure 10:
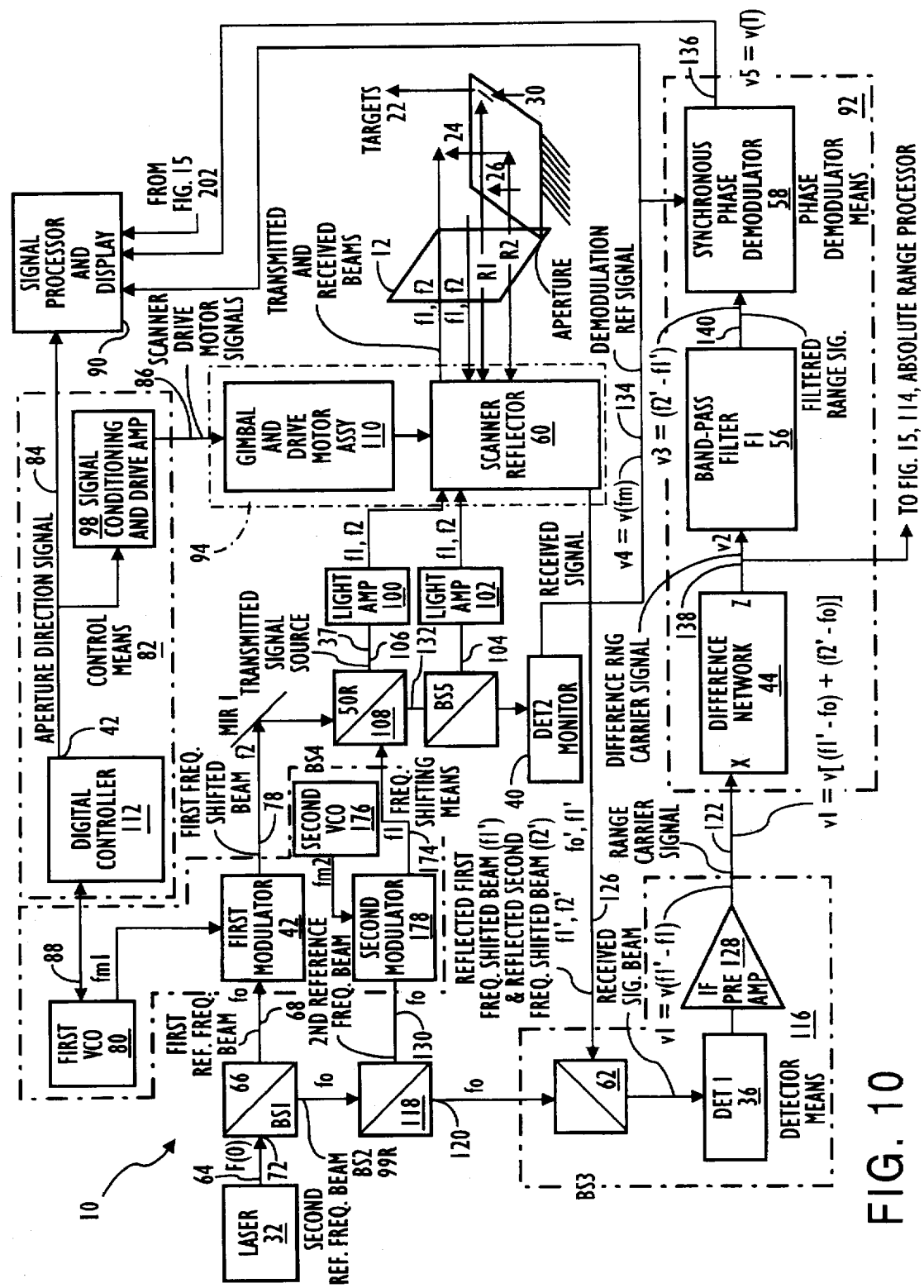
FIG. 10 is a block diagram showing the arrangement of components in the preferred double modulator embodiment of the invention laser radar of FIG. 6 for measuring relative range information between targets with no relative velocity between the laser radar and the target.

In the invention laser radar of FIG. 6, which is also shown with greater detail in FIG. 10, the DIFFERENCE DETECTOR 44 receives the amplified and mixed signal from DET 1, 36 as signal voltage v1. The DIFFERENCE DETECTOR 44 performs a difference function on the signal v1 by a digital differencing function characterized to extract the difference frequencies from the signal at v1. This mixing function is necessary to provide four significant spectral components at the signal v2 output which include:

fa=2*fd fb=2*(df+fd)

fc=df+/−2*fd and fe=−df

FIG. 7 graphically depicts the relative location of the spectral components of v1. FIG. 8 graphically depicts the relative location of the spectral components of v2. The first band in FIG. 8 depicts the spectral range of a spectral component fd that varies from zero to an upper frequency limit of 2*fd limit that relates to the relative velocity between the laser radar and the target. The second band has a spectral range centered at frequency df and extending above and below a center frequency of df by frequency fd. The third band is centered at 2*df and is easily filtered out.

FIG. 8 shows that with no relative motion between the target and the receiver present, signal energy is available at frequency df. With relative motion, the signal energy is found in two spectral component frequencies that move outward from frequency df in positive and negative directions to limits determined by the maximum value of doppler shift present, i.e. df+/−fd. Then spectral signal component fe, in the equation above, shows that a component of signal energy remains at frequency df.

Band 46 represents the spectral location of a doppler signal component 2*fd. This component of received signal information can reside anywhere in the allocated band up to the maximum frequency limit of 2*fd, 911 depending on the relative system to target velocity. The first and second halves of the second band at the center region of FIG. 9, i.e. 48, 50 represents a spectral range that contains spectral signal element that contains a fixed frequency component fm in addition to two side lobes that move in a range limited by +/−2*fd.

A third signal band having first and second half bands 52, 54 centered on 2*fm is also present. This band is easily filtered since it is an octave higher than fm and its side lobes are tailored to be far above fm.

FIGS. 9 and 10 each show a band pass filter 56 which is a passive filter designed to selectively extract only information at frequency fm within the band shown in FIG. 8 as BW1 for amplification and processing as the FILTERED RANGE SIGNAL v3 by the process of synchronous phase demodulation by the synchronous phase demodulator 58 for relative range determination.

The SYNCHRONOUS PHASE DEMODULATOR 58 measures the phase difference between the system reference signal v4 and the difference signal out of the band pass filter 56.

DUAL FREQUENCY OPERATION THEORY FOR FIG. 4

Intensity modulation for processing purposes results from the interaction of the light waves to yield constructive and destructive interference. Analytical expressions can be written to describe the operation of the system of the LASER RADAR of FIGS. 1 and 4 as follows:

The transmittal light from scanner reflector 60 (in FIG. 1) is represented by:

$$E_T(t) = E_{1T} \cos P_{1T}(t) + E_{2T} \cos P_{2T}(t) \quad (1)$$

where E1T is the amplitude coefficient associated with the first transmitted beam, E2T is the coefficient associated with the second transmitted beam. The subscript T denotes transmission and P(t) is the phase function defining the output of the laser. The letter "P" is used in place of the greek letter phi and ro is used in place of the greek letter rho in all cases below. Upon reflection from a target, the return signal to the input part of the receiver is $$E_R(t+u) = ro\, E_{1T} \cos P_{1R}(t+u) + ro\, E_{2T} \cos P_{2R}(t+u) \quad (2)$$

where the subscript ro denotes the received signal and u is the round trip transit time, 2R/C for a target range "R". It should be noted that the character of the phase function, $P_R(t+u)$, may or may not be the same as $P_T(t)$, dependent upon the relative velocity present between transmitter and receiver.

In the system configuration of FIG. 4, if ELO represents amplitude the coefficient of the signal from the local oscillator, LASER 3, 38 at the detector, PLO the frequency of the local oscillator and $E_R$ the coefficient of the received signal from equation 2 above, heterodyne operation at the detector can be defined by:

$$E_s(t) = E_{LO} \cos P_{LO}(t) + E_R(t+u) \quad (3)$$

Substituting the expression for $E_R(t+u)$ from (2) into (3) results in (3a)

$$E_s(t) = E_{LO}(t) \cos P_{LO}(t) + ro[E_{1T} \cos P_{1R}(t+u) + E_{2T} \cos P_{2R}(t+u)] \quad (3a)$$

The optical detector DET 1, 36 performs a square law function that yields:

$$I_s(t) = E_s(t)\, E_s(t)^*, \text{ where } E_s(t)^* \text{ is the complex conjugate of } Es(t)$$

$$I_s(t) = E_{LO}^2 \cos^2 P_{LO}(t) + ro^2 [E_{1T}^2 \cos^2 P_{1R}(t+u) + E_{2T}^2 \cos^2 P_{2R}(t+u) + 2 E_{1T} E_{2T} \cos P_{1R}(t+u) \cos P_{2R}(t+u)] + ro[2E_{LO} E_{1T} \cos P_{LO}(t) \cos P_{1R}(t+u) + 2E_{LO} E_{2T} \cos P_{LO}(t) \cos P_{2R}(t+u)]. \quad (4)$$

Equation (4) is the result of taking the product of Es(t) and its complex conjugate. Detector 1, 36 achieves this function. The resulting signal has four terms, each being a discrete intensity component with some of the terms being AC and some DC in character. Recall that $$\cos^2 x = \tfrac{1}{2}(1 - \cos 2x) = D.C. + A.C.$$

The identity for $\cos^2 x$ shows that the $\cos^{2x}$ A.C. terms in equation (4) are at twice the light frequency and are therefore beyond the detector response. Assuming all D.C. terms are blocked, Equation (4) reduces to:

$$I_s(t) ro^2[2E_{1T} E_{2T} \cos P_{1R}(t+u) \cos P_{2R}(t+u)] + ro\, [2E_{LO} E_{1T} \cos P_{LO}(t) \cos P_{1R}(t+u) + 2E_{LO} E_{2T} \cos P_{LO}(t) \cos P_{2R}(t+u)] \quad (5)$$

Since the product of the cosines of two different angles is controlled by the trigonometric identity:

$$\cos x \cos y = \tfrac{1}{2}[\cos(x+y) + \cos(x-y)]$$

and since the argument angle (x+y) represents angles changing with time as the sum of two optical frequencies which is also beyond the pass band of the detector, Equation (5) further reduces to $$I_s(t)\, ro^2\, E_{1T} E2T \cos [P_{1R}(t+u) - P2R(t+u)] + ro\, [E_{LO} E_{1T} \cos [P_{LO}(t) - P_{1R}(t+u)] + E_{LO} E_{2T} \cos [P_{LO}(t) - P_{2R}(t+u)]] \quad (6)$$

Equation (6) represents the basic return information of the system of FIG. 1 such as the signal v1 from BS3, 60 to DET1, 36.

The first term in Equation 6 is a "direct" detection quantity (local oscillator power for heterodyne gain its not involved) and for the signal levels expected can be ignored. (Close, highly reflective targets could probably be observed.) Thus, for the case in which $E_{1T} = E_{2T}$, (100% modulation).

$$I_s(t) = ro\, E_{LO}\, E_{1T}[\cos(P_{LO}(t) - P_{1R}(t+u)) + \cos(P_{LO}(t) - P_{2R}(t+u))] \quad (7)$$

Evaluation of Equation (7) depends upon the relationships among the signal angles $P_{LO}$, $P_{1R}$, and $P_{2R}$ which are continuously changing as functions of time (t). The signal information is processed in the present invention as signals in the frequency domain. The letter P is used to designate the greek letter phi. The term PLO designates the angular frequency of the local oscillator. The term P1R designates the angular rate of the first transmitted and received signal and the term P2R designates the angular rate of the second transmitted frequency as the signal is received. The terms PLO(t), P1R(t) and P2R(t) provide a measure of total angle when multiplied by t. Taking the derivative of these terms provides the following:

$$d/dt(P_{LO}(t)) = f_{LO}.$$

The same step is taken for $P_{1R}(t)$ and P2R(t) to obtain $$d/dt(P_{1R}(t)) = f_0 - f_d$$

and $$d/dt(P_{2R}(t)) = f_1 - f_d$$

where the Doppler shift is fd and a receding target is assumed.

Let df=(fo-f1)=the offset controlled frequency difference frequency between the transmitted laser beams. Equation (7) can now be written as $$I_s(t) = ro\, E_{LO}\, E_{1T}\, [\cos(f_{LO}t - (fo-fd)(t+u) + \cos[f_{LO}t - (f1-fd)(t+u)]]$$

$$I_s(t) = ro\, E_{LO}\, E_{1T}\, [\cos\,((f_{LO}-fo+fd)(t+u) - u f_{LO}) + \cos\,[(f_{LO}-f1+fd)(t+u) - u f_{LO}]]$$

$$I_s(t) = ro\, E_{LO}\, E_{1T}\, [\cos\,[(f_{LO}-fo+fd)(t+u) - u f_{LO}] + \cos\,[(f_{LO}-f1+df+fd)(t+u) - u f_{LO}]] \quad (9)$$

Equation (9) represents two carrier frequencies separated by the offset frequency df.

The IF and bandwidth requirements are determined by the difference frequency defined by $f_{LO}$-fo, and the range of doppler frequencies, fd, which are present.

To further process the information, consider that Equation (9) can be written in the form of:

$$I_s(t) = ro\, E_{LO}\, E1T\, [\cos A(t) + \cos B(t)]$$

where:

pi $A(t) = (f_{LO}-fo+fd)(t+u) - u f_{LO}$ $B(t) = (f_{LO}-fo+df+fd)(t+u) - u f_{LO}$ \quad (10)

Isolating and amplifying the signals from equation (10) above with subsequent RF detection by the DIFFERENCE DETECTOR 44 in FIG. 4 to obtain the difference frequencies yields the following expressions for v2(t):

$$v2(t)\, ro^2\, E_{LO}{}^2 E_{1T}{}^2\, [\cos^2 A(t) + \cos^2 B(t) + 2\cos A(t)\cos B(t)]$$

$$v2(t)\, ro^2\, E_{LO}\, E_{1T}{}^2\, [\tfrac{1}{2}(1+\cos 2A(t)) + \tfrac{1}{2}(1+\cos 2B(t)) + \cos(A(t)+B(t)) + \cos(A(t)-B(t))]. \quad (11)$$

Equation (11) shows that four new frequencies are generated and that their relationship in the processing spectrum must be considered. Differentiating the arguments to obtain the spectral components present at the output of DIFFERENCE DETECTOR 44 and within signal v2(t) yields:

$f_a = d/dt\, 2\,A(t) = 2\,(f_{LO}-f_o+f_d)$ $f_b = d/dt\, 2\,B(t) = 2\,(f_{LO}-f_o+df+f_d)$ $f_c = d/dt\,[A(t)+B(t)] = 2\,(f_{LO}-f_o+f_d) + df$ $f_e = d/dt\,[A(t)-B(t)] = -df$ \quad (12)

Information defined by equations (10) and (12) is available for determining imaging and range information in the v2 signal.

The invention laser radar systems of FIGS. 5 and 6 are mechanized without a separate local oscillator laser. The invention system of FIG. 6 is obtained from the system of FIG. 4 by letting the local oscillator frequency $f_{LO} = f_o$. By setting $f_{LO} = f_o$, the spectral content of the signal v1(t) at the output of DET 1, 60 is determined by differentiating the arguments A(t) and B(t) in (10) to obtain:

d/dtA(t)=$f_d$ d/dtB(t)=(df+fd) \quad (13)

FIG. 7 depicts these spectral ranges.

The spectral content of the signal v2(t) at the output of the DIFFERENCE DETECTOR 110 is obtained by differentiating the arguments of the terms of equation (12) to obtain:

$f_a = 2\, f_d$ $f_b = 2\,(df + f^d)$ $f_c = df + 2\, f_d$ $f_e = -df$ \quad (14)

FIG. 8 depicts these spectral ranges.

The equations above show that the necessary information for 3-D imaging and relative ranging are available. However, the existence of these spectral components is based on letting the local oscillator frequency $f_{LO} = f_o$ on the fd terms, or doppler shift terms due to relative velocity between the transmitter and the target being present.

As the relative velocity between the laser radar and the target within a pixel goes to zero, the fd terms go to zero in the above spectral components. It can be seen that the fa term goes to zero as fd goes to zero. The fb term is at least an octave above df, and in the systems of FIGS. 9 and 10, the fb term is filtered out by band pass filter 56. The term fc reduces to df. Since the fe term is −df, the fe spectral component disappears for the system of FIGS. 4 and 5 in the absence of relative velocity between the transmitter and the target.

If relative velocity is present, the above equations show that systems based on the topologies of FIG. 4 and 5 require no Doppler tracking circuitry. Reasonable requirements are placed upon the circuitry for frequency locking to the df offset. For moving transmitters, v2(t) requires the relative velocity be chosen so as not to inject signal In the processor bandwidth associated with df.

With the restrictions on df, as discussed above in connection with FIGS. 7 and 8, unambiguous range operation can be assured. However, df is a variable of this system, and operation need not be restricted since a narrow band processor tuned to df can effectively isolate the processor from Doppler effects for all conditions except for df=2 fd or 4 fd.

Range information is available from df (t+2R/C) through use of a synchronous demodulator 58. However, 2 dfR/C must be less than 2 π. This limitation requires that df be less than C/2R, if no ambiguities are required.

FIG. 9 shows a block diagram of a laser radar disclosed in copending U.S. patent application Ser. No. 07/085,499 filed Aug. 14, 1987 for a RADAR LASER TRANSMITTER having the same inventor and assignee. The system of FIG. 9 shows an embodiment of the system of FIG. 5 that uses a single laser and has no local oscillator. The single laser system is able to measure relative range to targets only if relative motion existed between the target and the transmitter.

The laser source 32 of FIG. 9 represents a laser means having a power source and a resonator cavity (not shown) containing a lasting medium, such as $CO_2$ gas. The laser means 32 provides a SINGLE FREQUENCY LIGHT SOURCE (FO). A laser with an output power of approximately 2 watts has been used at ranges of up to one kilometer.

The SINGLE FREQUENCY LIGHT SOURCE beam FO, 64 reaches beamsplitter BS1, 66 and is divided. BS1 66 is a 50R beamsplitter for dividing the SINGLE FREQUENCY LIGHT SOURCE (FO) beam 64 into a FIRST and SECOND REFERENCE FREQUENCY BEAM 68, 70, respectively.

Approximately 50% of the energy transmitted by laser source 32 on beam 64 strikes the left side of BS1, 66 and is reflected down as beam 70 having frequency fo. Approximately 50% of the energy from beam 64 passes through BS1 to form beam 68, also having frequency fo. Beamsplitter BS1, 66 represents a first beam splitter having at least a first input port 72 and reflected and transmitting output ports 74 and 76, respectively. The input port 72 of BS1 is positioned to receive the SINGLE FREQUENCY LIGHT SOURCE (FO). The reflected output port 74 transmits the SECOND REFERENCE FREQUENCY BEAM 70. Transmitting output port 17 provides a FIRST REFERENCE FREQUENCY BEAM 68. The FIRST REFERENCE FREQUENCY BEAM enters a frequency modulator 42. MODULATOR 42 represents a frequency shifting means, or frequency modulator responsive to a FREQUENCY DIFFERENCE SIGNAL fm for frequency shifting the FIRST REFERENCE FREQUENCY BEAM 68 to form a FREQUENCY SHIFTED BEAM fl, 78. An electro-optic modulator could be adapted for equivalent use. The frequency of the FREQUENCY SHIFTED BEAM 78 is typically shifted up in frequency.

The MODULATOR 42 is an AO coupler that is driven by a sinusoidal oscillator output from VCO 80 at frequency $f_m$, at typically 40 MHz. AO devices such as the MODEL#AGD 756, an ACOUSTIC OPTIC CELL, are available from INTRA ACTION CORP. of Bellhood, Ill. 60104.

Phantom block 82 represents a CONTROL MEANS for providing APERTURE DIRECTION SIGNALS via signal line 84, 86 and a FREQUENCY DIFFERENCE SIGNAL to VCO 20 via signal line 88. The aperture direction signals are typically digital signals on a data bus characterizing what pixel the transmittal beam is pointing at in the target aperture. The digital coordinates of the same pixel location information is sent to the signal processor and display 90 to permit it to store the digitized v5 signal from the PHASE DEMODULATOR MEANS represented by phantom block 92. Each aperture direction signal serves as a memory address for the corresponding intensity, and relative range values associated with that pixel.

Elements within phantom block 94 represents a scanner means responsive to SCANNER DRIVE MOTOR SIGNALS via signal path 86 from CONTROL MEANS 82 for combining and directing the FIRST REFERENCE FREQUENCY BEAM fo and the FREQUENCY SHIFTED BEAM fl to each predetermined target aperture location and for receiving a REFLECTED REFERENCE FREQUENCY BEAM SIGNAL fo' and a REFLECTED FREQUENCY SHIFTED BEAM fl' via received beams 96 from the targets 22, 26, 26 and 30. In alternative embodiments, the beam can be scanned in an ordered pattern while the encoded position of the beam is constantly fed to the SIGNAL CONDITIONING AND DRIVE AMP 98 and/or to the SIGNAL PROCESSOR AND DISPLAY 90 to permit the collected data to be mapped into a memory within the SIGNAL PROCESSOR AND DISPLAY 90.

AMP1, 100 and AMP2, 102 represent light amplifiers for the separate channel amplification of respective frequencies $f_o$, $f_r$. These amplifiers are optional and provide for balanced output light levels at higher power to obtain greater range capability.

The signal frequencies on beam 104 to AMP 2 are identical to those on path 106 to AMP 1 130 but are 180 degrees out of phase with fo and fl on path 106.

The scanner 94 typically has a scanner reflector means 60 positioned to receive light from the REFERENCE FREQUENCY BEAM fo and the FREQUENCY SHIFTED BEAM fl via signal path 106 from BS4, 108. The scanner reflector 60 typically contains a single highly reflective mirror (not shown) for directing the combined beams fo and fl through a sequence of scan lines, as shown in FIG. 1, thereby illuminating a scene, pixel by pixel or location by location as characterized by FIGS. 3(a)–3(e). The singly highly reflector mirror is synchronously driven on two axis of rotation as shown in FIG. 1. Encoders are employed to provide azimuth and pitch pointing data corresponding to the pixel being illuminated and viewed.

In an alternative scanner (not shown), the scanner reflector 60 uses two highly reflective mirrors, each mirror synchronously pivoting on an orthogonal axis of rotation.

Scanner 94 typically has a GIMBLE AND DRIVE MOTOR ASSEMBLY represented by block 110 that supports and provides drive torque to the scanner reflector 60 in response to SCANNER DRIVE MOTOR SIGNALS via signal line 86. A separate motor typically drives each axis. The motor drive for moving the reflector in alternate directions is electrically reversed by limit switches. In an alternative embodiment, reversing clutches are used in conjunction with a gear box as in conventional antenna drive systems for radar sets.

The scanner 94 combines and directs the FIRST REFERENCE FREQUENCY BEAM fo and the FREQUENCY SHIFTED BEAM f2 to each target aperture pixel location as shown by FIGS. 3(a)–3(e). The predetermined target aperture locations of FIGS. 3(a)–3(e) are characterized as points or locations in a scanned array of pixel locations through which the combined beams pass to reach the target scene. Each of the pixel locations has a corresponding set of memory data locations or storage registers in the functional block described as signal processor and display 90 shown in FIG. 9.

As shown in FIGS. 1, 9 and 10, as the combined beam is scanned or directed to successive predetermined aperture locations, the scanner 94 also receives a combined REFLECTED REFERENCE FREQUENCY BEAM SIGNAL fo' and a REFLECTED FREQUENCY SHIFTED BEAM SIGNAL f2' from the target. FIGS. 9 and 10 show beam fo' and f2' being received at reflector 94, in scanner.

The phrase "predetermined aperture locations" is not intended to convey the limiting notion of predetermined holes or spaces in a mechanical mask. The term is rather intended to convey the notion of scanning an image scene, line by line, each line having a predetermined number of dedicated locations or viewing regions or spaces through which the scanner sequentially points the combined beam.

The embodiments of FIGS. 9 & 10 have a digital controller 112 for providing a recurring sequence of digitized predetermined aperture location direction control signals from output port 114 to the SIGNAL CONDITIONER AND DRIVE AMP 98. The SIGNAL CONDITIONER AND DRIVE AMP 98 receives the digitized aperture direction control signals from the DIGITAL CONTROLLER 112 and conditions these signals as required to output the scanner drive motor signals on signal line 86 to gimbal and drive motor assembly 110. In a first embodiment, the gimbal and drive motor assembly is a digital servo capable of pointing the combined beam through any aperture pixel location that the signal from the SIGNAL CONDITIONER and DRIVE AMP DESIGNATES 98.

Phantom block 50 in FIGS. 9 and 10 represents a detector means responsive to a sample of the REFERENCE FREQUENCY BEAM fo from BS2 118 output port 120 in combination with the REFLECTED REFERENCE FREQUENCY BEAM SIGNAL fo' and the REFLECTED FREQUENCY SHIFTED BEAM SIGNAL f2' to provide A FILTERED RANGE CARRIER SIGNAL v1 on signal line 122. DETECTOR MEANS 116 combines, mixes and amplifies a sample of the SECOND REFERENCE FREQUENCY BEAM fo via beam 124 in combination with the REFLECTED REFERENCE FREQUENCY BEAM SIGNAL fo' and the REFLECTED FREQUENCY SHIFTED BEAM SIGNAL fl' via beam 126 to obtain a RANGE CARRIER SIGNAL via path 122.

DETECTOR MEANS 116 in FIG. 10 is identical in function to block 116 in FIG. 9. The detector means 116 combines a sample of the SECOND REFERENCE FREQUENCY BEAM at frequency fo from the BS2 output port 120 and uses BS3, 62 to combine the beam with REFLECTED FIRST FREQUENCY SHIFTED BEAM (fl') and REFLECTED SECOND FREQUENCY SHIFTED BEAM (f2'). The combined beams are mixed by DET1 36, amplified by 1F PRE AMP 128 to provide a RANGE CARRIER SIGNAL v2 via signal path 122 to the input of the PHASE DEMODULATOR MEANS 92.

The elements within DET2, block 40 of FIG. 9, represent a monitor means for combining and detecting a sample of the SECOND REFERENCE FREQUENCY BEAM fo via beam paths 70, 130, and 132 and a sample of the FREQUENCY SHIFTED BEAM via beam paths 32 and 132 to form a DEMODULATION reference signal, v4 on signal line 134 out of the DET2 MONITOR 40. In an alternative embodiment, the FIRST REFERENCE FREQUENCY BEAM is used in place of the SECOND REFERENCE FREQUENCY BEAM since both of these beams have frequency fo, each of which represents a REFERENCE FREQUENCY BEAM.

Elements within phantom block 92 of FIGS. 9 and 10 represent a phase demodulator means referenced to the DEMODULATION REFERENCE SIGNAL (v4) via signal line 134 and responsive to the FILTERED RANGE CARRIER SIGNAL v1 via signal line 122 for demodulating the RANGE CARRIER SIGNAL to provide a RELATIVE RANGE SIGNAL v5 on signal line 136.

DET2, block 40 in FIG. 10 performs an identical function to block 40 in FIG. 9. DET2 of FIG. 10 combines a sample of the FIRST FREQUENCY SHIFTED BEAM and the SECOND FREQUENCY SHIFTED BEAM to form a DEMODULATION REFERENCE SIGNAL on signal line 134 and to supply this signal to the SYNCHRONOUS PHASE DEMODULATOR 58 and to the SIGNAL PROCESSOR AND DISPLAY 90.

Block 44 of FIG. 9 represents a digital difference network responsive to the RANGE CARRIER SIGNAL on signal line 122 for processing the RANGE CARRIER SIGNAL to provide a RANGE CARRIER SIGNAL v2 on signal line 106 or for processing fo, fo' and $f_i'$ to obtain (fo–fo) and $f_i$–fo).

In an alternative embodiment, the DIFFERENCE NETWORK means 44 has a first input, X, and an output Z. The input, X, is responsive to the RANGE CARRIER SIGNAL via signal line 122. The output Z provides the RANGE CARRIER SIGNAL as signal voltage v2 on signal line 138. Block 44 of FIG. 10, the preferred embodiment, performs a function identical to block 110 in FIG. 9. The signal out of block 44 in FIG. 10 is called the DIFFERENCE RANGE CARRIER SIGNAL, v2 and contains (f2'- fl') plus wanted noise and spectral components due to doppler shift. The DIFFERENCE RANGE CARRIER signal is typically extracted using digital combination and differencing procedures.

Block 56 of FIG. 1, titled BAND PASS FILTER represents a filter means responsive to the RANGE CARRIER SIGNAL v2 for filtering the RANGE CARRIER SIGNAL within a predetermined band-pass to provide a FILTERED RANGE SIGNAL v3 on signal line 140. The break points of the band-pass filter 56 limits the bandwidth of the system, and is related to the number of pixels to be imaged.

BAND-PASS FILTER 56 is typically synthesized to establish the noise limits of the system. In the system of FIG. 10, the band-width of this filter is set by the dwell time of the transmitted SOURCE comprised of the FIRST FREQUENCY SHIFTED BEAM and the SECOND FREQUENCY SHIFTED BEAM on the illuminated target. In a typical system in which the beam spends 10 us on each pixel, the band-pass of filter 56 is designed to roll off all frequencies above 100 kHz. This design limit is not related to doppler shift or to the fm frequency.

The invention system of FIG. 10 is capable of measuring the range to a target while the target range is changing or while there is no relative velocity between the transmitter and the target by measuring the time or phase angle between a DEMODULATION REFERENCE SIGNAL v4 zero crossing and the RELATIVE RANGE SIGNAL v5 zero crossing. Recall that the DEMODULATION REFERENCE SIGNAL v4 has a frequency fm. As the range of a target is increased, the time required for transmitted light to reach the target and return increases, thereby providing a greater phase shift between the FILTERED RANGE SIGNAL v3 and fm.

Block 58 of FIG. 10 represents a synchronous phase demodulator responsive to the FILTERED RANGE SIGNAL v3 and to the DEMODULATOR REFERENCE SIGNAL v4 for providing the RELATIVE RANGE SIGNAL v5 on signal line 136. The phase demodulator functions to select only information from v3 having a frequency matched to the frequency of v4, i.e. (f1–f2).

Block 90 represents a signal processing means responsive to the RELATIVE RANGE SIGNAL v5 via signal line 136 for quantizing and storing the value of the amplitude of the corresponding RELATIVE RANGE SIGNAL and for quantizing and storing the value of the corresponding relative phase delay between the RELATIVE RANGE SIGNAL (v5) and the DEMODULATION REFERENCE SIGNAL (v4) for each respective location or pixel in the target aperture.

In a more particular embodiment, the SIGNAL PROCESSOR AND DISPLAY MEANS 90 samples the stored pairs of corresponding values for amplitude and phase delay for each respective location in the target aperture and displays a composite color video in response to the respective phase delay signal for each predetermined location in the target aperture. Clustered targets having different ranges from the invention laser radar, when imaged by the composite color video signal, are each imaged with a color shift, the color shift being selected, in response to the phase shift, to indicate an increase or decrease in distance.

Figure 11:
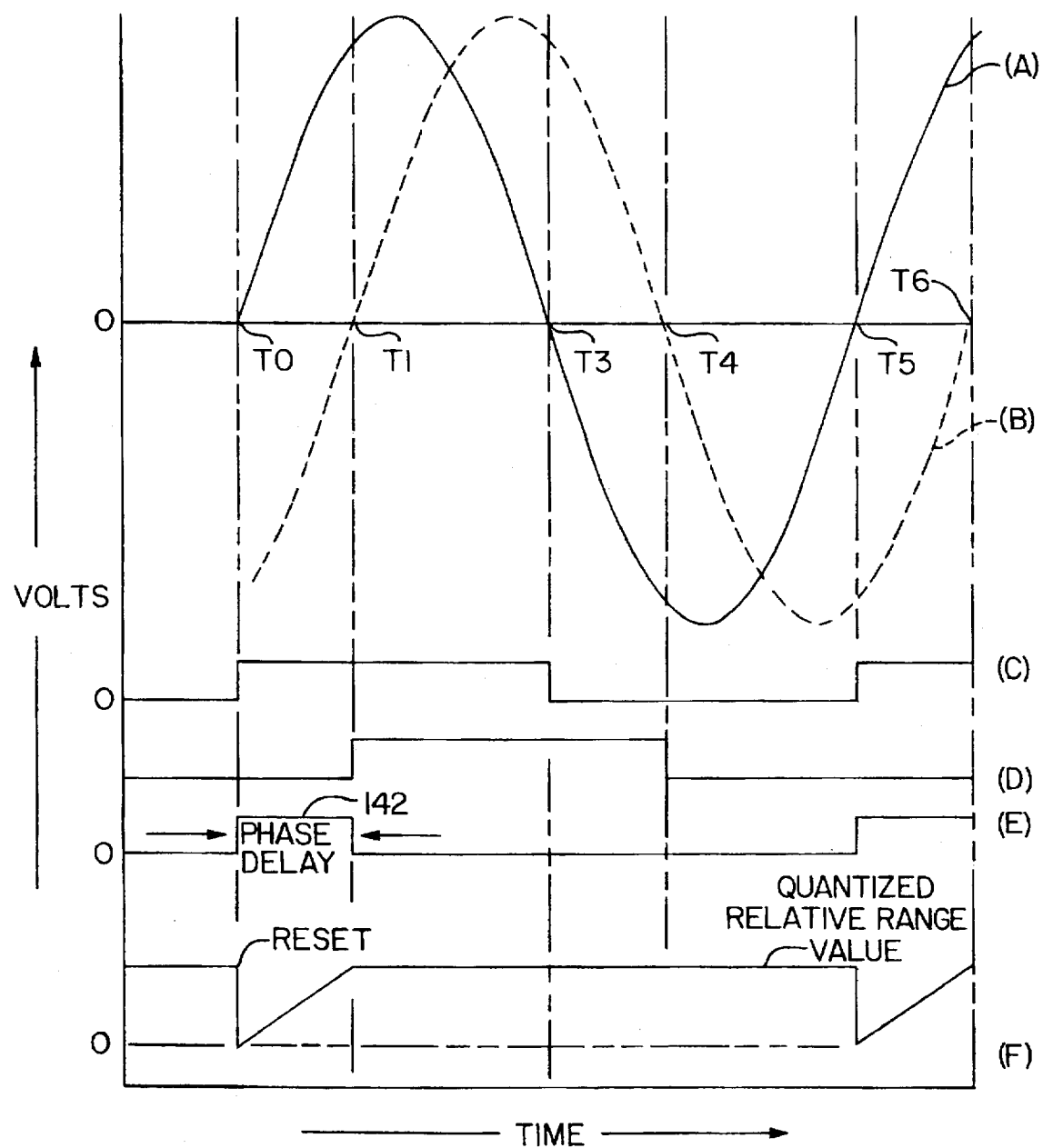
FIG. 11 is a timing diagram for the for the relative range feature of the invention laser radar and receiver of FIGS. 9 and 10.

FIG. 11 shows a waveform (A) as representing v4 from DET2, 40 on signal line 134. Waveform (B) represents the signal v5 on signal line 136 leaving the PHASE DEMODULATOR MEANS 92. Waveform (C) represents the output of a flip-flop that is set as waveform (A) crosses the zero reference line. Waveform (D) represents the output of a second flip-flop that is set as waveform (B) crosses the zero reference line. Waveform (E) represents the output of an exclusive nor gate having inputs driven by the first and second flip-flop. The time duration of waveform (E) in the one state 142 is used to control the start and stop points of the ramp generator having an output characterized by waveform (F). A precision integrator circuit could be designed to provide an output in accordance with waveform (F) when driven by an input signal such as characterized by waveform (E). The quantized range value of waveform (F) is available for sampling with an ADC during all intervals for which waveform (E) is in a low state. A counter could be used to drive an accumulator at a clock rate during the interval that waveform (E) is in a one state and the value of the accumulator during the interval for which waveform (E) is in a low state would represent the quantized range value for storage by the signal processor and display 90. The accumulator would be reset each time waveform (E) transitions from a low to a high state.

Figure 12:
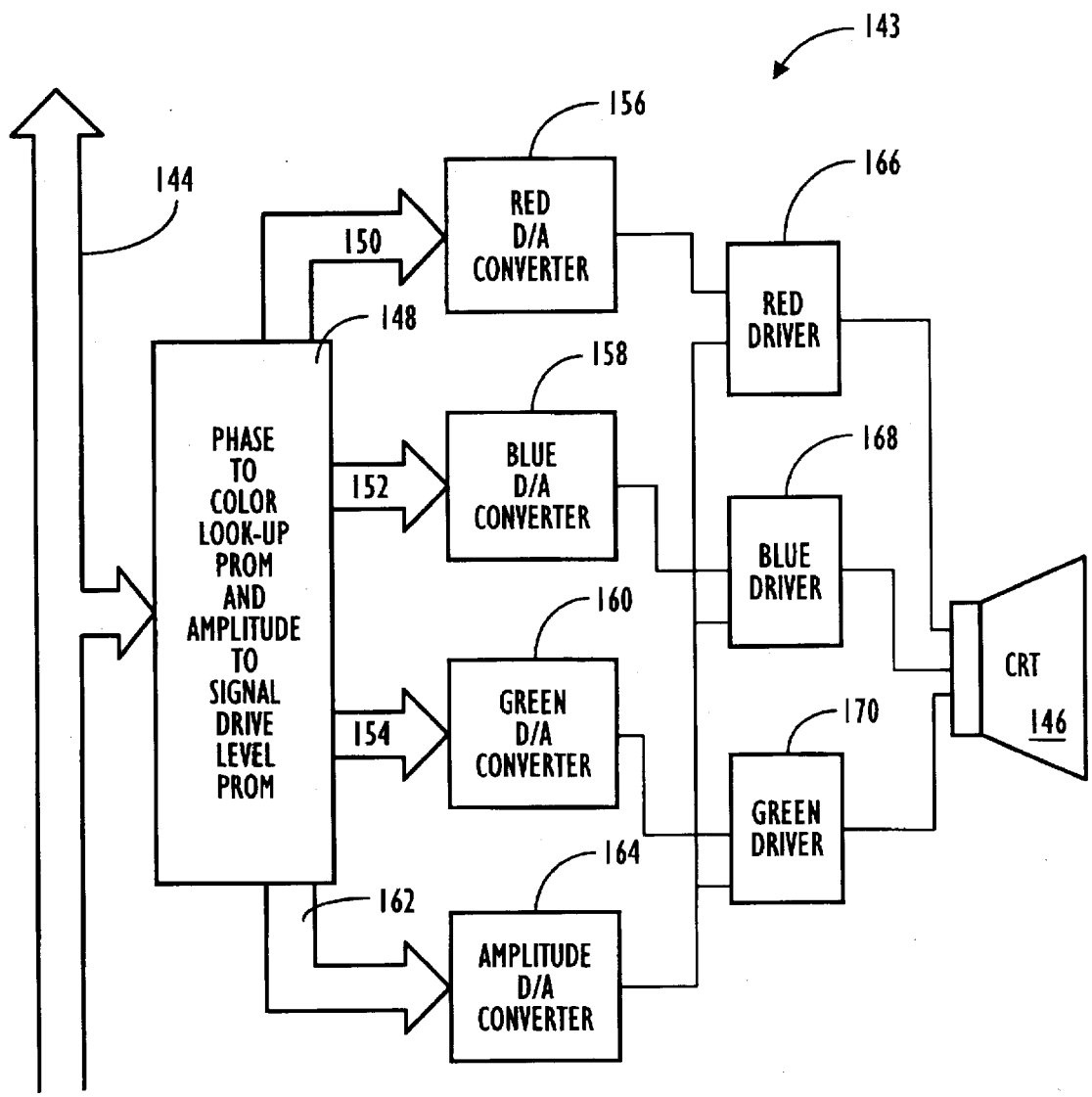
FIG. 12 is a block diagram of a typical video control and signal drive means for coloring each pixel in a displayed scene in accordance with the relative range of a target in the aperture pixel.

FIG. 12 depicts a display means 143 arrangement for shifting the color of individual pixels as a function of the relative range of the target in one pixel with respect to another. Bus 144 represents a data and address bus arrangement driven by a processor synchronized to the horizontal and vertical deflection system for CRT 146 and also to the address of successive memory locations in which relative range information is stored. Block 148 represents a processor for extracting the relative range information for a particular pixel from a particular memory location along with the respective intensity information and for using the value of relative range to look up a corresponding value for the red, blue, and green color contributions to the amplitude of the signal for that respective pixel. The color processor communicates the value of the red, blue, and green levels via data bus 150, 152, and 154 to respective converters 156, 158, and 160. The intensity or contrast value is transmitted via bus 162 to the amplitude converter 164.

Analog outputs from the respective converters are distributed to respective drivers 166, 168, and 170. The outputs from each respective color driver ts then used to modulate the respective guns in CRT 146.

ABSOLUTE RANGE PROCESSOR

Figure 15:
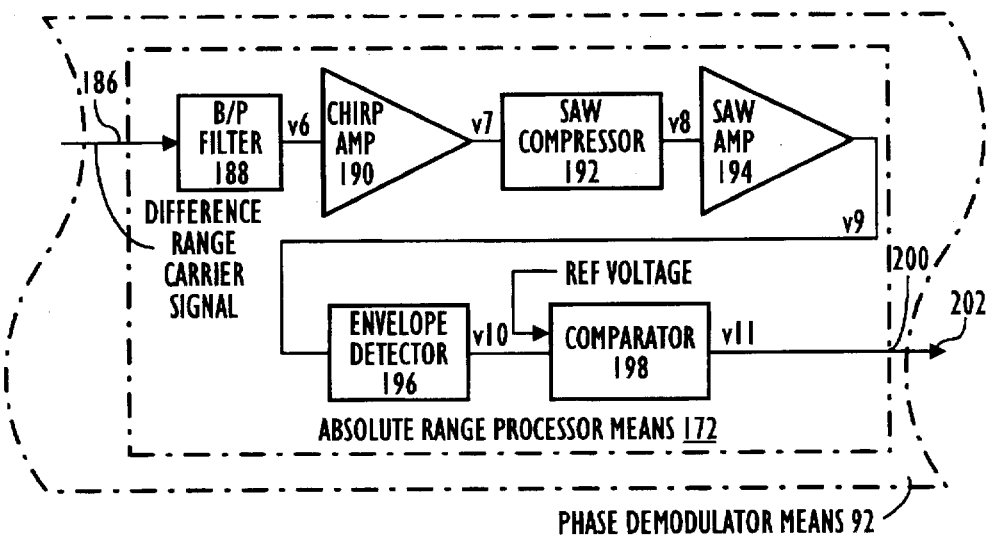
FIG. 15 is a block diagram of an absolute range processor for use with the invention laser radar of FIG. 10.

Referring to FIG. 10, and more particularly to phantom box 92, the DIFFERENCE RANGE CARRIER SIGNAL v2 is coupled from the output of DIFFERENCE NETNORK 44 to the input of the ABSOLUTE RANGE PROCESSOR MEANS shown in FIG. 15 as phantom block 172. To measure the absolute range of the target reflecting light in any particular pixel, the digital controller 112 of FIG. 10 sweeps or chirps the frequency of the second frequency shifted beam 174 by coupling a ramp voltage to the input of second VCO 176. The second VCO provides signal fm2 to the input of the second modulator 31.

Figure 14:
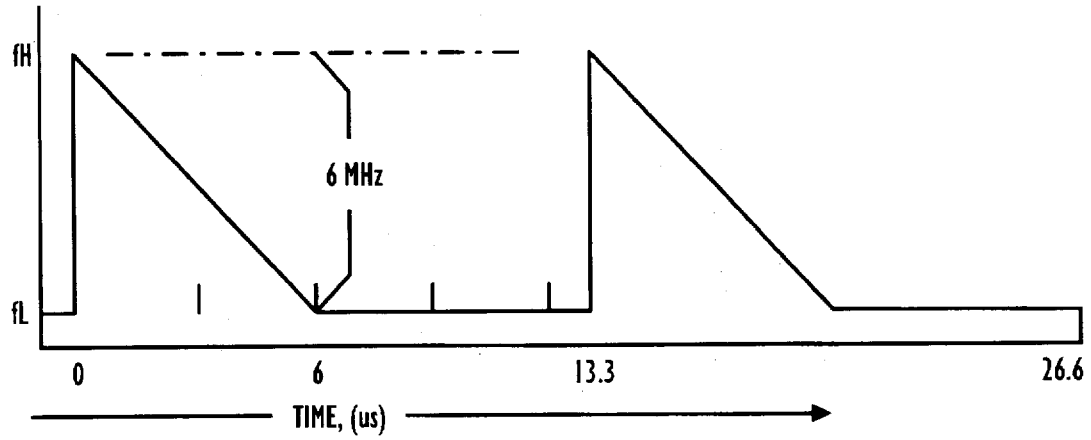
FIG. 14 shows the frequency vs. time relationship for a transmitted and received chirp signal.

FIG. 14 depicts a typical ramp voltage applied to second VCO 176 by the digital controller 112.

Figure 13:
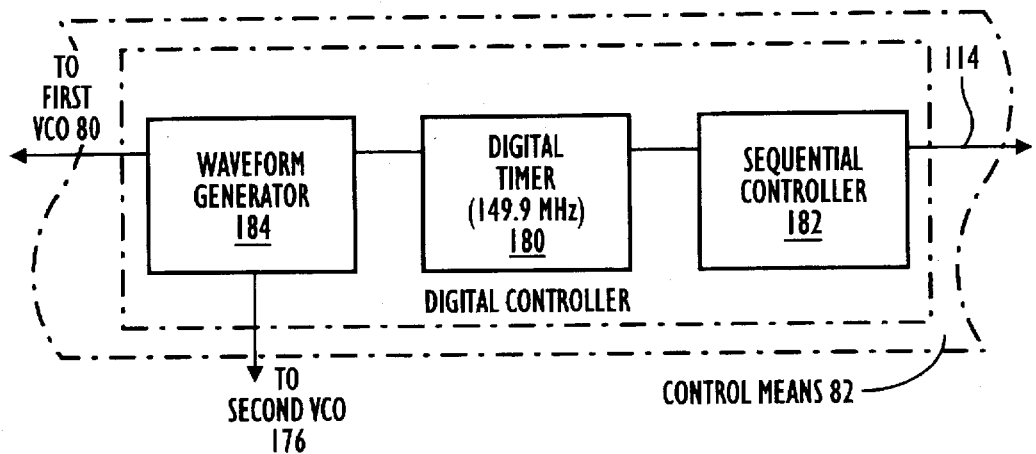
FIG. 13 is a block diagram of the digital controller of FIG. 10.

FIG. 13 shows the digital controller 112 in greater detail. A precision digital timer operating at 149.9 MHz, 180 provides timing signals to the sequential controller 182 and to the waveform generator, 184. The waveform generator provides a control voltage to the first VCO 80 and the combination of a control voltage and a chirp voltage, as shown in FIG. 14 to the second VCO 176.

In the embodiment of FIGS. 10, 13, 14 and 15, the frequency of the second frequency shifted beam changes from a high frequency limit to a low frequency limit over a range of typically 6 MHz and over a time interval of six microseconds. The frequency shifted information travels to the target and returns at the speed of light. The chirped signal is received and demodulated and provided as the DIFFERENCE RANGE CARRIER SIGNAL v2 on signal line 186 to the input of B/P FILTER 188 as shown in FIG. 15. The output of B/P FILTER 188 is provided to the input of CHIRP AMP 190 and amplified by 20 to 40 db. The output of CHIRP AMP 190 is provided as signal voltage v7 to SAW COMPRESSOR 192.

The SAM compressor 192 receives the demodulated ramped signal v7 and compresses it to provide a pulse as signal v8 to SAW AMP 194. The signal v8 is amplified by SAW AMP 194 by 20 to 40 db and provided as signal pulse v9 to ENVELOPE DETECTOR 196 which removes high frequency information within the pulse. The envelope detector 196 provides a sharp centered pulse as signal v10 to COMPARATOR 198.

Comparator 198 receives the signal pulse v10 and provides a change of state it its output voltage as signal v11 as the signal v10 penetrates a predetermined reference voltage input to comparator 198. Signal pulse v11 passes from the output of the PHASE DEMODULATION MEANS 92 via ABSOLUTE TIMING OUTPUT 200 on signal line 202 to the input of SIGNAL PROCESSOR AND DISPLAY 90 as shown in FIG. 10.

The frequency compression characteristics of the SAW COMPRESSOR 192 are predetermined and calibrated. The DIGITAL CONTROLLER 112 provides a reference timing signal via output 114 and signal line 84 to the input of signal processor and display 90 at the start of each chirp. The SIGNAL PROCESSOR AND DISPLAY 90 measures the time required for the chirped signals to travel to the target within the pixel and to be reflected and processed by the ABSOLUTE RANGE PROCESSOR MEANS 172 to provide an output pulse on signal line 202. The time required for the compression of the chirped signal is the same for an undelayed transmitted signal as it is for a transmitted signal that has moved to a target and returned. The time for the signal to move to the target and to return can be determined by the SIGNAL PROCESSOR AND DISPLAY 90 with great precision by measuring the time delay between the pulse on signal line 202 and the reference timing signal on signal line 84 to signal processor 90 and by subtracting the fixed time delay for compression. The measured time difference enables the signal processor and display to convert the time required into a precise, absolute range for storage with the relative range and the respective intensity for each pixel within the image scene.

The use of continuous beams of very low power (i.e., one or two watts) makes it difficult for surveillance systems to detect a dual beam laser radar scanning an image scene. Use of a continuous source necessitates the use of SAW compressor 192 as a means of obtaining absolute time differences for the time between transmission and the time a signal is received.

The description provided is intended to be illustrative only and is not intended to be limitative. Those skilled in the art may conceive of modifications to the figure disclosed. However, any such modifications which fall within the purview of the description are intended to be included therein as well. The scope of this invention shall be determined from the scope of the following claims including their equivalents.

What is claimed is:

1. A laser radar for scanning a target aperture having a predetermined array of locations comprising:

a laser means having a power source and a resonator cavity containing a lasing medium, said laser means providing a SINGLE FREQUENCY LIGHT SOURCE (FO);

means for dividing said SINGLE FREQUENCY LIGHT SOURCE into FIRST and SECOND REFERENCE FREQUENCY BEAMS;

control means for providing APERTURE DIRECTION SIGNALS and a FIRST and SECOND FREQUENCY CONTROL SIGNAL;

frequency shifting means responsive to said FIRST and SECOND FREQUENCY CONTROL SIGNAL for frequency shifting said FIRST REFERENCE FREQUENCY BEAM and said SECOND REFERENCE FREQUENCY BEAM to form a respective FIRST FREQUENCY SHIFTED BEAM and a respective SECOND FREQUENCY SHIFTED BEAM;

scanner means responsive to said APERTURE DIRECTION SIGNALS for combining and directing said FIRST FREQUENCY SHIFTED BEAM and said SECOND FREQUENCY SHIFTED BEAM to each predetermined target aperture location and for receiving a combined REFLECTED FIRST FREQUENCY SHIFTED BEAM SIGNAL and a REFLECTED SECOND FREQUENCY SHIFTED BEAM SIGNAL from said target;

detector means for combining and detecting a sample of said SECOND REFERENCE FREQUENCY BEAM in combination with said REFLECTED FIRST FREQUENCY SHIFTED BEAM SIGNAL and said REFLECTED SECOND FREQUENCY SHIFTED BEAM SIGNAL to provide a RANGE CARRIER SIGNAL;

monitor means for combining and detecting a sample of said FIRST FREQUENCY SHIFTED BEAM and said SECOND FREQUENCY SHIFTED BEAM to form a DEMODULATION REFERENCE SIGNAL;

phase demodulation means referenced to said DEMODULATION REFERENCE SIGNAL and responsive to said RANGE CARRIER SIGNAL for demodulating said RANGE CARRIER SIGNAL to provide a RELATIVE RANGE SIGNAL; and signal processor and display means responsive to said RELATIVE RANGE SIGNAL and to the APERTURE DIRECTION SIGNALS for quantizing and storing the digital value of the amplitude of the corresponding relative phase delay between the RELATIVE RANGE SIGNAL and said DEMODULATION REFERENCE SIGNAL for each respective location in said target aperture.

2. The laser radar of claim 1 wherein said means for dividing said SINGLE FREQUENCY LIGHT SOURCE into FIRST and SECOND REFERENCE FREQUENCY BEAMS further comprises:

a first beamsplitter having at least a first input port and reflected and transmitting output ports; said input port being positioned to be responsive to said SINGLE FREQUENCY LIGHT SOURCE (Fo), said reflect output port being characterized to provide said FIRST REFERENCE FREQUENCY BEAM and said output port being characterized to provide a SECOND REFERENCE FREQUENCY BEAM.

3. The laser radar of claim 1 wherein said control means further comprises:

a digital controller for providing a recurring sequence of DIGITIZED APERTURE DIRECTION SIGNALS; and a signal conditioner and drive amplifier for conditioning and scaling said DIGITIZED APERTURE DIRECTION SIGNALS to provide scanner drive motor signals characterized to drive said scanner means to reflect said FIRST and SECOND FREQUENCY SHIFTED BEAMS to each target aperture location to be illuminated by said combined FIRST and SECOND FREQUENCY SHIFTED BEAMS.

4. The laser radar of claim 1 wherein said scanner means further comprises:

a scanner reflector means responsive to said combined FIRST and SECOND FREQUENCY SHIFTED BEAMS for reflecting said beams to a target and for continuously receiving said combined REFLECTED FIRST and SECOND FREQUENCY SHIFTED BEAM signals from said target; and gimbal and drive motor assembly responsive to said drive motor signals for driving said reflector means laterally and vertically to sequentially point said combined FIRST and SECOND FREQUENCY SHIFTED BEAMS at each successive target aperture location in response to said SCANNER DRIVE MOTOR SIGNALS and to receive said combined REFLECTED FIRST and SECOND FREQUENCY SHIFTED BEAM signals from each said target aperture location.

5. The laser radar of claim 1 wherein said detector means further comprises:

a beamsplitter responsive to a sample of said SECOND REFERENCE FREQUENCY BEAM, said combined REFLECTED FIRST and SECOND FREQUENCY SHIFTED BEAM for combining said beams to provide a RECEIVED SIGNAL BEAM; and diode detector and amplifier means responsive to said RECEIVED SIGNAL BEAM for mixing said beam signals to provide said RANGE CARRIER SIGNAL.

6. The laser radar of claim 1 wherein said detecting means further comprises:

a bias and amplifier means for biasing said detector diode, and for amplifying said low level RANGE CARRIER SIGNAL, the gain and bandwidth of said amplifier being characterized to provide said RANGE CARRIER SIGNAL having an amplitude in a predetermined range.

7. The laser radar of claim 1 wherein said phase demodulator means further comprises:

differencing means responsive to said RANGE CARRIER SIGNAL to provide a PROCESSED RANGE CARRIER SIGNAL;

filter means responsive to said PROCESSED RANGE CARRIER SIGNAL for filtering said PROCESSED RANGE CARRIER SIGNAL within a predetermined band-pass to provide a FILTERED RANGE SIGNAL; and a synchronous phase demodulator responsive to said FILTERED RANGE SIGNAL and to said DEMODULATOR REFERENCE SIGNAL for providing said RELATIVE RANGE SIGNAL.

8. The laser radar of claim 7 wherein said differencing means further comprises:

a DIFFERENCE NETWORK HAVING an input responsive to said RANGE CARRIER SIGNAL, said output providing said PROCESSED RANGE CARRIER SIGNAL containing the a signal containing the frequency difference between said REFLECTED FIRST and SECOND FREQUENCY SHIFTED BEAM.

9. The laser radar of claim 1 wherein said signal processor and display means further comprises:

a display means for displaying an image of the scene scanned by said scanner as an array of illuminated pixels (picture elements), the intensity of each pixel being controlled by the stored amplitude value of said RELATIVE RANGE SIGNAL, the color of each pixel being controlled by the stored value of the relative phase delay between the RELATIVE RANGE SIGNAL and said DEMODULATION REFERENCE SIGNAL.

10. The laser radar of claim 1 wherein said signal processor and display means further comprises:

a display means for displaying a perspective image of the scene scanned by said scanner as an array of illuminated pixels (picture elements), the location and intensity of each pixel being controlled by the respective APERTURE DIRECTION SIGNAL and the corresponding stored amplitude value of said RELATIVE RANGE SIGNAL and the color of each pixel being controlled by the stored value of the corresponding relative phase delay between the RELATIVE RANGE SIGNAL and said DEMODULATION REFERENCE SIGNAL.

11. The laser radar of claim 1 wherein said PHASE DEMODULATOR MEANS further comprises:

means responsive to said range carrier signal for measuring the absolute time for light to move from the laser radar to the target and return.

12. A laser radar for scanning a target aperture having a predetermined array of locations comprising:

a laser means having a power source and a resonator cavity containing a lasing medium, said laser means providing a SINGLE FREQUENCY LIGHT SOURCE (FO);

means for dividing said SINGLE FREQUENCY LIGHT SOURCE into FIRST and SECOND REFERENCE FREQUENCY BEAMS;

control means for providing APERTURE DIRECTION SIGNALS and for providing a FIRST and SECOND FREQUENCY CONTROL SIGNAL;

frequency shifting means responsive to said FIRST and SECOND FREQUENCY CONTROL SIGNAL for frequency shifting said FIRST REFERENCE FREQUENCY BEAM and said SECOND REFERENCE FREQUENCY BEAM to form a respective FIRST FREQUENCY SHIFTED BEAM and a respective SECOND FREQUENCY SHIFTED BEAM;

scanner means responsive to said APERTURE DIRECTION SIGNALS for combining and directing said FIRST FREQUENCY SHIFTED BEAM and said SECOND FREQUENCY SHIFTED BEAM to each predetermined target aperture location and for receiving a combined REFLECTED FIRST FREQUENCY SHIFTED BEAM SIGNAL and a REFLECTED SECOND FREQUENCY SHIFTED BEAM SIGNAL from said target;

detector means for combining and detecting a sample of said SECOND REFERENCE FREQUENCY BEAM in combination with said REFLECTED FIRST FREQUENCY SHIFTED BEAM SIGNAL and said REFLECTED SECOND FREQUENCY SHIFTED BEAM SIGNAL to provide a RANGE CARRIER SIGNAL;

monitor means for combining and detecting a sample of said FIRST FREQUENCY SHIFTED BEAM and said SECOND FREQUENCY SHIFTED BEAM to form a DEMODULATION REFERENCE SIGNAL;

phase demodulator means referenced to said DEMODULATION REFERENCE SIGNAL and responsive to said RANGE CARRIER SIGNAL for squaring said RANGE CARRIER SIGNAL to form a SQUARED RANGE CARRIER SIGNAL and for band pass filtering and demodulating said SQUARED RANGE CARRIER SIGNAL to provide a RELATIVE RANGE SIGNAL; and signal processor and display means responsive to said DEMODULATION REFERENCE SIGNAL, said RELATIVE RANGE SIGNAL and to the APERTURE DIRECTION SIGNALS for quantizing and storing the digital value of the amplitude of the corresponding RELATIVE RANGE SIGNAL and for quantizing and storing the value of the corresponding relative phase delay between the RELATIVE RANGE SIGNAL and said DEMODULATION REFERENCE SIGNAL for each respective location in said target aperture.

13. The laser radar of claim 12 wherein said phase demodulator means referenced to said DEMODULATION REFERENCE SIGNAL and responsive to said RANGE CARRIER SIGNAL for processing said RANGE CARRIER SIGNAL to form a PROCESSED RANGE CARRIER SIGNAL and for band pass filtering and demodulating said SQUARED RANGE CARRIER SIGNAL to provide a RELATIVE RANGE SIGNAL further comprises:

means responsive to said range carrier signal for measuring the absolute time for light to move from the laser radar to the target and return.

* * * * *